UNITED STATES PATENT OFFICE.

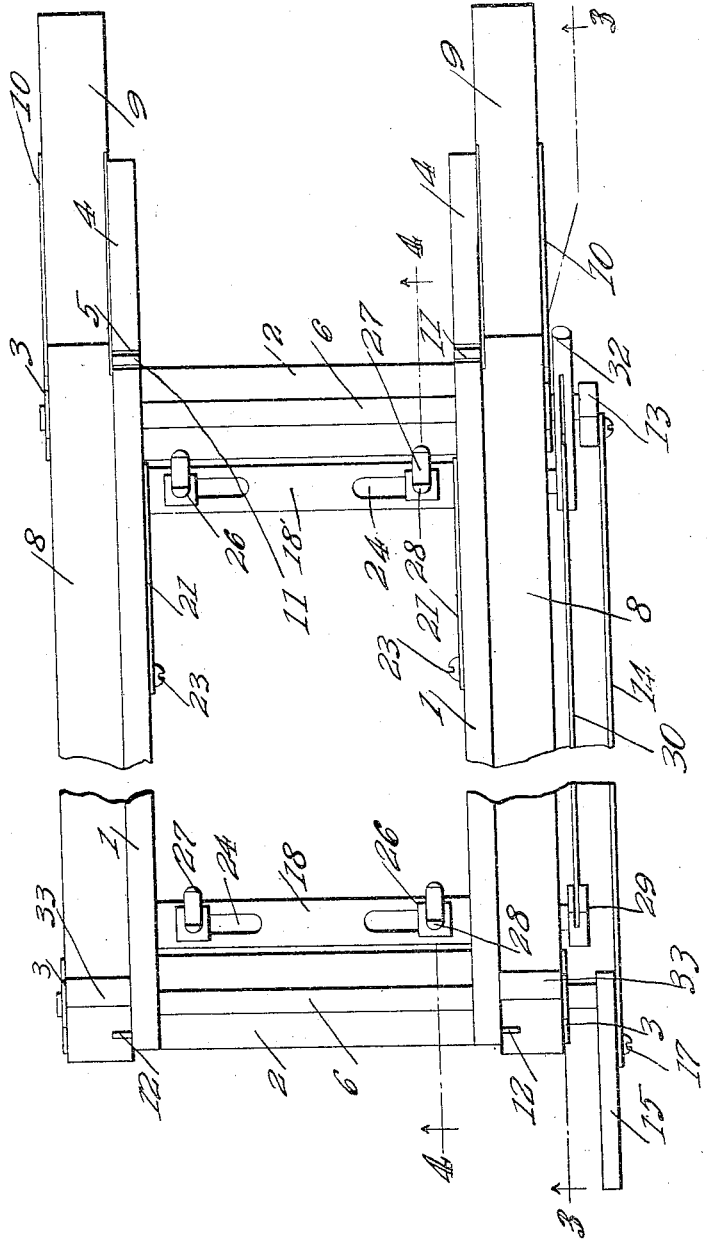

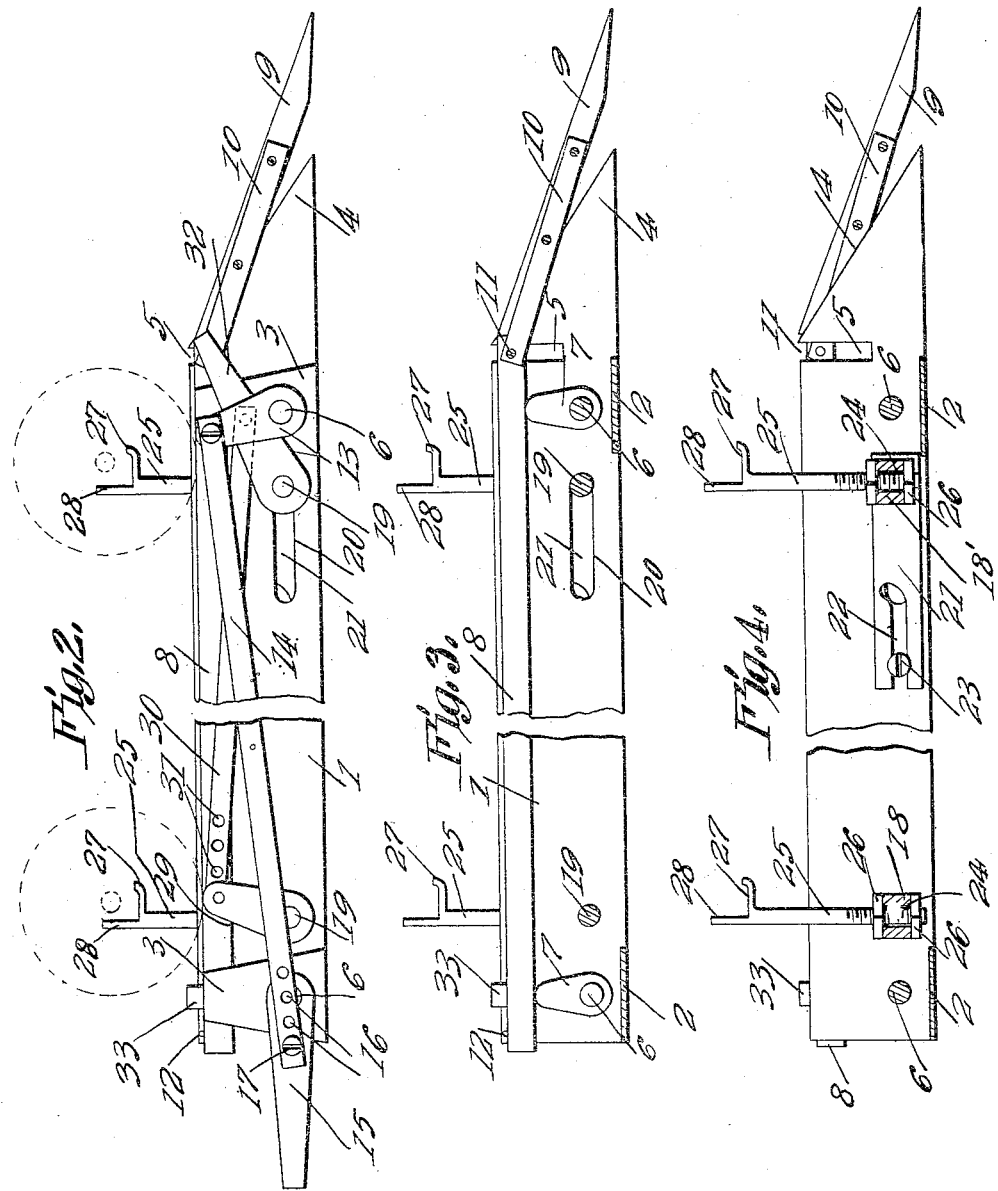

LEWIS MARION PRATT, OF IOLA, KANSAS.

AUTOMOBILE-JACK.

1,251,280. Specification of Letters Patent. Patented Dec. 25, 1917.

Application filed March 12, 1917. Serial No. 154,223.

*To all whom it may concern:*

Be it known that I, LEWIS MARION PRATT, a citizen of the United States, residing at Iola, in the county of Allen and State of Kansas, have invented a new and useful Automobile-Jack, of which the following is a specification.

The present invention appertains to jacks, and aims to provide a novel and improved jack onto which an automobile or other vehicle can be run, and which is operable for supporting the vehicle by the axles, or the like, whereby to relieve the pneumatic tires of the weight of the machine, when the vehicle is in the garage or not in use.

It is the object of the invention to provide an automobile jack of the nature indicated possessing novel and improved features of construction, to enhance the utility and efficiency thereof, the structure being comparatively simple and inexpensive.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a plan view of the jack, portions being broken away.

Fig. 2 is a side elevation thereof, portions being broken away.

Figs. 3 and 4 are longitudinal sections taken on the respective lines 3—3 and 4—4 of Fig. 1, portions being broken away.

The jack embodies a suitable base embodying the parallel longitudinal beams 1 adapted to rest upon the floor or ground, and cross pieces 2 secured to the lower edges of the beams near the opposite ends thereof, the ends of said cross pieces projecting beyond the beams and being provided at the outer sides of the beams with standards 3. The forward ends of the beams 1 are preferably inclined, as at 4, and the beams having vertical slots 5 near their forward ends and opening upwardly.

Carried by the base is a vertically movable means for supporting the wheels of the vehicle which are run onto the jack. Thus, transverse shafts 6 are journaled through the beams 1 and standards 3 adjacent to the ends of the base, and have cams 7 secured thereon between the beams and standards. Longitudinal rails 8 are fitted slidably between the beams 1 and standards 3 and are seated upon the cams 7 to be supported for vertical movement thereby. Inclines 9 are disposed at the forward ends of the rails 8 and have bars or straps 10 secured thereto and projecting from the rear upper ends of the inclines, and connected by pivot pins 11 with the forward ends of the rails 8. The forward free ends of the inclines 9 rest slidably upon the floor, and when the rails 8 are raised and lowered, the rear ends of the inclines will be raised and lowered accordingly. The pins 11 project into the slots 5 to prevent longitudinal shifting of the rails and inclines at their various positions. The inclines 9 enable the wheels of the vehicle to run onto and off of the rails 8 longitudinally of the jack. Pins 12 are carried by the beams 1 at the rear ends thereof and overhang the rails 8 to hold said rails seated upon the cams, although by lifting the forward ends of the rails to remove the pins 11 from the slots 5, the rails 8 can be withdrawn longitudinally from under the pins 12, to disassemble the structure. An arm 13 secured to one end of one shaft 6 is connected by a link 14 with a lever 15 secured to the corresponding end of the other shaft 6, the link 14 having a series of apertures 16 for adjustable engagement with the pivot 17 carried by the lever 15, whereby said link and lever can be adjusted relatively. The arm 13 and lever 15 are arranged at an angle relative to one another, and when the lever 15 is swung downwardly and rearwardly, as seen in Fig. 2, this will rotate the shafts 6 to raise the cams 7 and the rails 8 supported by the cams, and the lever 15 in swinging into substantial alinement with the link 14 (the parts assuming a dead center position), this will prevent the cams 7 from swinging downwardly although when the lever 15 is raised, the shafts 6 can be readily rotated for lowering the cams and lowering the rails 8.

The jack embodies other means for supporting the axles of the vehicle when the rails 8 are lowered, and for this purpose, a pair of transverse shafts 18 and 18' near the rear and forward ends of the base, have reduced terminals 19 journaled through the beams 1. The beams 1 have longitudinal slots 20 slidably receiving the terminals 19 of the forward shaft 18', and slides 21 engaged with the terminals 19 of the shaft 18, are disposed against the inner sides of the beams 1 and are provided with longitudinal slots 22 receiving clamping screws or members 23 carried by the beams 1. By loosening the screws 23, the slides 21 can be shifted longitudinally with the shaft 18', to adjust the shafts 18 and 18' for the wheel base of the particular vehicle with which the jack is used. It is thus possible to adjust the shaft 18', forwardly and rearwardly in a simple manner. The shafts 18 and 18' have longitudinal slots 24 through which the lower terminals of posts 25 extend, and nuts 26 being threaded upon said posts and bearing against the upper and lower surfaces of the shafts 18 and 18' to clamp the posts adjustably in position. The nuts 26 can be adjusted for adjusting the posts 25. Said posts are provided at their upper ends with axle seats 27 and fingers 28 projecting upwardly above the seats 27. An arm 29 secured to one terminal 19 of the shaft 18 is connected by a link 30 with a lever 32 secured to the corresponding terminal 19 of the shaft 18', the link 30 having a series of apertures 31 for adjustable engagement with the pivot between the arm 29 and link, whereby the link 30 can be adjusted relative to the arm 29 according to the relative position of the shafts 18 and 18'. When the lever 32 is swung forwardly, it will rotate the shafts 18 and 18' to raise the posts 25, the lever 32 resting against one shaft 6, to support said posts in upright position. When the lever 32 is swung rearwardly, the posts 25 will be swung rearwardly and downwardly out of the way.

Stops 33 are provided on the rails 8 for preventing the wheels from rolling off of said rails, to limit the movement of the vehicle onto the jack.

In operation, when the posts 25 are swung rearwardly and downwardly, and the lever 15 is swung rearwardly to raise the cams 7 and rails 8, the automobile or vehicle is then run onto the jack, the heels moving up the inclines 9 on to the rails 8, as seen in dotted lines in Fig. 2. The lever 32 is then swung forwardly to swing the posts 25 upwardly so that the fingers 28 contact with the axles of the vehicles, bringing the seats 27 below said axles. The rails 8 are then lowered by swinging the lever 15 upwardly and forwardly, to swing the cams 7 downwardly. This permits the rails to gravitate with the wheels supported thereby and the axles of the vehicle will then seat upon the seats 27 to be supported by the posts 25. The rails 8 in being moved away from the tires, will transfer the weight of the machine from the tires to the axles, thus relieving the tires of undue pressure when the automobile is supported by the jack when not in use. When the vehicle is to be used, the lever 15 is swung rearwardly to raise the cams 7 and rails 8, whereby said rails again support the wheels of the vehicle, said wheels being raised to raise the axles from the seats 27. The posts 25 are then swung rearwardly out of the way, and the vehicle can run off of the rails 8 down the inclines 9 into the floor.

Having thus described the invention, what is claimed as new is:—

1. A vehicle jack embodying a base having beams and standards at the outer sides thereof, rails slidable vertically between said beams and standards and prevented from transverse displacement thereby, shafts journaled through the beams and standards below the rails, cams carried by the shafts between the beams and standards on which the rails are seated, inclines, pivot elements connecting said inclines with the rails at one end, the beams having vertical slots receiving said pivot elements, means for rocking said shaft, and means carried by the base between said beams for supporting a vehicle.

2. A vehicle jack embodying a base, a pair of longitudinal rails for the wheels of a vehicle, the base having means guiding said rails for vertical movement and preventing transverse movement thereof, inclines pivoted to the rails at one end of the base to seat on the floor, the rails and base having interengageable means for preventing the longitudinal movement of the rails on the base, means carried by the base on which the rails are seated for raising and lowering said rails, and means carried by the base between the rails for supporting a vehicle.

In testimony that I claim the foregoing as my own, I have hereto affixed my signature in the presence of two witnesses.

LEWIS MARION PRATT.

Witnesses:
  V. G. SMITH,
  G. A. LEFFLER.

Copies of this patent may be obtained for five cents each, by addressing the "Commissioner of Patents, Washington, D. C."